No. 65,753. PATENTED JUNE 11, 1867.
W. KEEMLE.
ENGINE PISTON.
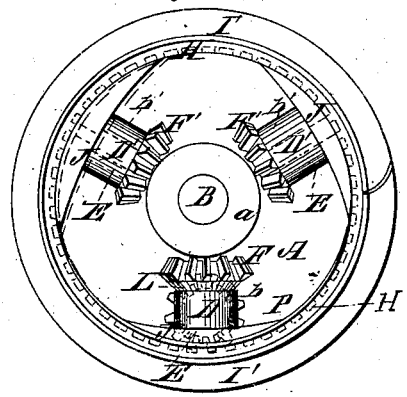
Fig. 1.
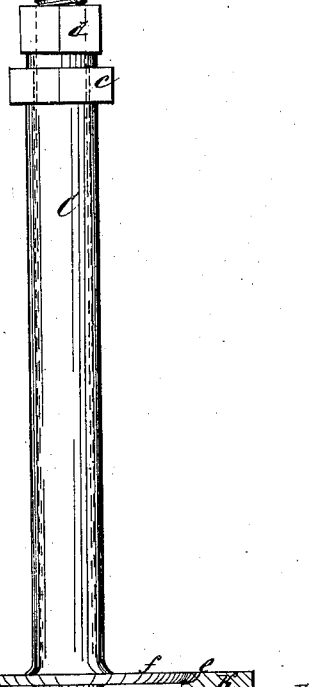
Fig. 2.
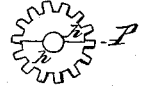
Fig. 3.
Fig. 4.
Fig. 5.
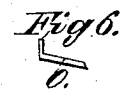
Fig. 6.
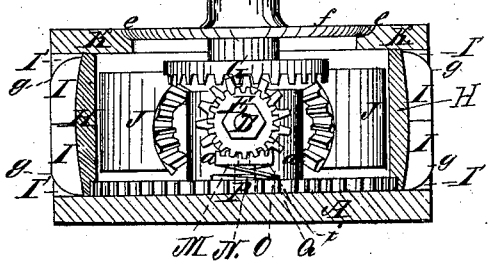
Witnesses:
Inventor:
Washington Keemle

United States Patent Office.

WASHINGTON KEEMLE, OF PHILADELPHIA, PENNSYLVANIA.

Letters Patent No. 65,753, dated June 11, 1867.

---

IMPROVEMENT IN ENGINE PISTONS.

---

The Schedule referred to in these Letters Patent and making part of the same.

---

TO ALL WHOM IT MAY CONCERN:

Be it known that I, WASHINGTON KEEMLE, of the city and county of Philadelphia, and State of Pennsylvania, have invented a new and improved Mode of Adjusting Piston Packing; and I do hereby declare that the following is a full and exact description thereof, reference being had to the accompanying drawings, and to the letters of reference marked thereon.

The nature of my invention mainly consists in adjusting piston packing by means of nuts on radial screws, and arranged in pinions which gear into a crown-wheel on the end of a tube which surrounds the piston-rod, as will be understood by the following description. In the accompanying drawings, which make a part of this specification—

Figure 1 is a plan of a piston with the improvement attached, the tube C and ring K being removed.

Figure 2 is a longitudinal section of do.

Figures 3 and 4 are views of the pinion P.

Figures 5 and 6 are views of the pawl O.

Like letters in all the figures indicate the same parts.

A is the piston flange on the rod B. C is a tube, which surrounds the rod, there being a small space between the latter and the inner periphery of the former, to allow of a slight variation of the rod in adjusting the packing. The tube slides in a stuffing-box in the head of the cylinder, which is not shown in the drawings. There are radial screw-rods D D' D', the inner ends of which are made fast in the enlargement $a$ of the rod B. On these rods there are nuts E E' and E', which, as they are screwed outwards, set out the packing against the cylinder, the nuts sliding in central chambers in the bosses $b$ $b'$ $b'$ of the pinions F F' F', which gear into the crown-wheel G on the inner end of the tube C, the said tube being provided with an enlargement, $e$, on its outer end, which is connected with the cross-head, similar to the mode usually adopted in connecting the piston-rod. H is a follower ring, which bears against the rings I I and I' I', which form the periphery of the packing. There are cast-iron or other metallic springs J J J, against which the nuts E E' E' bear in setting out the packing. The thread on the screw D, on which the former nut works, is of coarser pitch than that on the upper screw-rods D' D', so as to set out the packing at the lower side of the cylinder further than at the upper side of the same, to compensate for the increased wear of the cylinder at its lower side. The rings I' I' are somewhat smaller in diameter than the rings I I, but when the nut $d$ on the rod B is screwed tight enough against the outer end of the tube C to close the ball-and-socket joint $e$ connecting the flange $f$ of the tube with the follower plate K, and to press said follower tight upon the follower ring H, the said rings I' I' are spread out even, or nearly so, with the packing rings I I without bearing hard upon the cylinder, the main objects of the joints tending to the free adjustment of the said packing rings, when the piston-rod B is out of line with the cylinder, and equalizing their bearing, by resisting too great a pressure outwards at any point caused by the piston-rod B being out of line.

For the purpose of turning the packing partly around to equalize the bearing of the same, I connect with the pinion F a bevel-wheel, L, which gears into the pinion M on the stud N, which projects from the piston flange A. To the under side of said pinion M, I attach a pawl, O, which, when the tube C is turned in the direction of the arrow to set out the packing, slides freely over the inclines $h$ $h$ of the pinion P, which gears into the follower ring H; but when the packing is to be moved partly around, the tube should be turned in the contrary direction, and then the pawl catches against one of the shoulders $i$ $i$, and causes the pinion P to turn and revolve the packing. The pawls are held down so as to touch either of the inclines $h$ $h$ by means of the spring Q. If the bearing surfaces of the springs J J J were made to fit the follower ring H before it was pressed outward, they would open at the ends of the springs when the pressure is applied to expand the packing. To obviate this difficulty I make them of a flatter curve than the ring, and then when the tube C is turned and the nuts E E' E' are forced outward against the spring by the operation of the crown-wheel G on the pinions F F' F', as hereinbefore described, the whole surface of the springs is made to bear against the rings.

It will readily appear that in consequence of the ball-and-socket joint $e$ connecting the flange $f$ of the tube C with the follower ring K, a free adjustment of the packing is effected, as the piston-rod B is thereby permitted to incline either way out of line with the cylinder, so that the packing may be made to press equally all around against the same, the ball-and-socket joints $g\ g$, which connect the rings $I'\ I'$ with the rings $I\ I$, also permitting this adjustment.

Having thus described my invention, what I claim therein as new, and desire to secure by Letters Patent, is—

1. The combination and arrangement of the central tube C with the packing, by means of the crown-wheel G, pinions $F\ F'\ F'$, and nuts $E\ E'\ E'$, substantially in the manner described and for the purpose specified.

2. The combination of the pinion P with the follower ring H and with the wheel L, by means of the pinion M and pawl O, substantially as described and for the purpose set forth.

3. Constructing the screw-thread of the rod D of coarser pitch than those of the rods $D'\ D$, substantially as described and for the purpose specified.

In testimony that the above is my invention, I have hereunto set my hand and affixed my seal this ninth day of March, 1867.

WASHINGTON KEEMLE. [L. S.]

Witnesses:
    STEPHEN USTICK,
    JOHN WHITE.